United States Patent
Madhavapeddi et al.

(10) Patent No.: US 9,143,884 B2
(45) Date of Patent: Sep. 22, 2015

(54) ENHANCING INFORMATION DELIVERY TO A CALLED PARTY

(71) Applicant: Nuance Communications, Inc., Burlington, MA (US)

(72) Inventors: Shreedhar Madhavapeddi, Seattle, WA (US); Gary Clayton, San Francisco, CA (US); Abhishek Chhibber, Redmond, WA (US); Pim van Meurs, Kenmore, WA (US); Sundar Balasubramanian, Seattle, WA (US)

(73) Assignee: Nuance Communications, Inc., Burlington, MA (US)

( * ) Notice: Subject to any disclaimer, the term of this patent is extended or adjusted under 35 U.S.C. 154(b) by 269 days.

(21) Appl. No.: 13/673,688

(22) Filed: Nov. 9, 2012

(65) Prior Publication Data

US 2014/0134988 A1    May 15, 2014

(51) Int. Cl.
*H04M 3/42* (2006.01)
*H04W 4/00* (2009.01)
*H04W 4/02* (2009.01)

(52) U.S. Cl.
CPC ............... *H04W 4/00* (2013.01); *H04W 4/003* (2013.01); *H04W 4/02* (2013.01)

(58) Field of Classification Search
CPC .... H04M 3/42042; H04M 1/57; H04M 1/575
USPC ................. 455/415; 379/88.01, 88.06, 88.22, 379/265.01, 265.09, 266.01, 266.06; 705/14.53, 14.64; 717/143
See application file for complete search history.

(56) References Cited

U.S. PATENT DOCUMENTS

| | | | | |
|---|---|---|---|---|
| 5,309,505 | A * | 5/1994 | Szlam et al. | 379/88.01 |
| 5,511,112 | A * | 4/1996 | Szlam | 379/266.06 |
| 5,740,231 | A * | 4/1998 | Cohn et al. | 379/88.22 |
| 5,873,068 | A * | 2/1999 | Beaumont et al. | 705/14.53 |
| 5,923,879 | A * | 7/1999 | Sasmazel et al. | 717/143 |
| 5,982,856 | A * | 11/1999 | Cohn et al. | 379/88.06 |
| 5,987,116 | A * | 11/1999 | Petrunka et al. | 379/265.13 |
| 6,031,895 | A * | 2/2000 | Cohn et al. | 379/88.13 |
| 6,628,770 | B1 | 9/2003 | Jain et al. | |
| 7,187,761 | B2 | 3/2007 | Bookstaff | |
| 7,539,484 | B2 | 5/2009 | Roundtree | |
| 7,751,548 | B1 | 7/2010 | Mashinsky et al. | |
| 7,756,545 | B2 | 7/2010 | Roundtree | |

(Continued)

OTHER PUBLICATIONS

International Search Report and Written Opinion for International Application PCT/US2013/069322; Applicant Nuance Communications, Inc.; Mail Date Jun. 9, 2014; pp. 17.

*Primary Examiner* — William D Cumming
(74) *Attorney, Agent, or Firm* — Perkins Coie LLP

(57) ABSTRACT

A facilitation and enhancement of interactions between a caller and a called party, such as a call center. The enhancement of interactions between a mobile device caller and a call center is by the communication of the mobile device caller's location and/or preferences to the call center. The communication can be in the form of a data structure stored on a computer-readable storage device, which may be transmitted from the mobile device caller to a call center controller. The data structure contains a caller identification entry, which allows the call center to match the data structure with a caller. In addition, a caller context entry associates additional data to the caller identification entry. The additional data includes at least one preference and/or location of the caller. Processor-based methods are disclosed to create, transmit, and/or utilize the data structure.

20 Claims, 11 Drawing Sheets

(56) References Cited

U.S. PATENT DOCUMENTS

| | | | |
|---|---|---|---|
| 7,783,305 B2 | 8/2010 | Ross et al. | |
| 8,170,545 B1 | 5/2012 | Freeburne | |
| 8,238,540 B1* | 8/2012 | Duva et al. | 379/265.01 |
| 8,401,172 B1* | 3/2013 | Duva et al. | 379/266.01 |
| 8,416,944 B2 | 4/2013 | Erhart et al. | |
| 8,577,016 B1* | 11/2013 | Duva et al. | 379/265.09 |
| 8,666,378 B2 | 3/2014 | Spence et al. | |
| 8,675,844 B2 | 3/2014 | Min et al. | |
| 8,687,794 B1* | 4/2014 | Spievak et al. | 379/266.01 |
| 8,725,745 B2 | 5/2014 | Zargahi et al. | |
| 8,755,511 B2* | 6/2014 | Duva et al. | 379/265.09 |
| 8,767,946 B1* | 7/2014 | Duva et al. | 379/265.09 |
| 8,781,105 B1* | 7/2014 | Duva et al. | 379/265.09 |
| 2001/0049363 A1 | 12/2001 | Rubin et al. | |
| 2002/0067816 A1 | 6/2002 | Bushnell | |
| 2004/0122730 A1 | 6/2004 | Tucciarone et al. | |
| 2008/0043983 A1 | 2/2008 | Waalkes et al. | |
| 2008/0304639 A1* | 12/2008 | McDonough et al. | 379/93.01 |
| 2009/0067599 A1 | 3/2009 | Agarwal et al. | |
| 2009/0089144 A1 | 4/2009 | Hodge, Jr. | |
| 2009/0207983 A1 | 8/2009 | Nour-Omid | |
| 2011/0289015 A1 | 11/2011 | Mei et al. | |
| 2012/0254042 A1 | 10/2012 | Ludemann | |
| 2013/0059613 A1 | 3/2013 | Kumar et al. | |
| 2014/0128043 A1 | 5/2014 | Shen | |
| 2014/0134988 A1* | 5/2014 | Madhavapeddi et al. | 455/415 |
| 2014/0136331 A1 | 5/2014 | Madhavapeddi et al. | |
| 2014/0314215 A1* | 10/2014 | Duva et al. | 379/88.01 |

* cited by examiner

System Directories

302 Application Directory by Phone Number

| Phone number: | Application: |
|---|---|
| 800-GOFEDEX | http://market.android.com/details?id=com.fedex.ida.android |
| 800-WELLSFA | http://appstore/wellsfargo.apk |
| 800-TARGET1 | http://appstore/target.apk |
| 800-STARBUC | http://appstore/starbucks.apk |
| *123 | http://appstore/dragon-visual-voicemail.apk |
| ... | |

304 Keyword Directory by Phone Number

| Phone number: | Application: |
|---|---|
| 800-GOFEDEX | fedex shipping track package label ground number tracking freight delivery |
| 800-WELLSFA | wells fargo mortgage bank locations financial stock branches hours investments |
| 800-TARGET1 | target stores locations sales corporation and coupon clothes shopping kohls |
| 800-STARBUC | starbucks locations menu coffee cups barista store hours mugs keurig |
| *123 | voicemail visual VM |
| ... | |

306 Application Directory by Keyword

| Keyword | App Name | Application download link |
|---|---|---|
| fedex | Parcel | http://itunes.apple.com/app/parcel/id375589283?mt=8 |
| fedex | FedEx Mobil | http://itunes.apple.com/app/fedex-mobile/id304462049?mt=8 |
| fedex | Posted | http://itunes.apple.com/app/posted/id355963410?mt=8 |
| fedex | Track Packages | http://itunes.apple.com/app/track-packages/id395973914?mt=8 |
| wells fargo | Wells Fargo Mobile | http://itunes.apple.com/app/wells-fargo-mobile/id311548709?mt=8 |
| wells fargo | Wells Fargo CEO Mobile | http://itunes.apple.com/app/wells-fargo-ceo-mobile/id335685323?mt=8 |
| wells fargo | Credit Card Processing Merchant Account | http://itunes.apple.com/app/credit-card-processing-merchant/id322348845?mt=8 |
| wells fargo | FastCustomer: Fast customer service | http://itunes.apple.com/app/fastcustomer-fast-customer/id421471487?mt=8 |
| ... | | ... |

308 Caller Directory by Dialed Phone Number

| Dialed Phone Number | Caller |
|---|---|
| 800-GOFEDEX | 206-555-1212, 206-555-1000 |
| 800-WELLSFA | 206-555-9010, 206-555-4888 |
| ... | |

FIG. 3

*Dear Mr. PackageEx Marketing Manager:*

*Over the last three days, 15,000 Android and iOS smartphone users in our network dialed 1-800-PACKAGE -- missing out on the graphically-enhanced customer experience that you are currently offering via your PackageEx app for Android and iOS devices.*

*If you respond now, we can promote your PackageEx smartphone app to these users while PackageEx is still fresh on their minds, via an on-screen message delivered using our innovative mobile marketing platform.*

*Additionally, we can present users in our network who dial 1-800-PACKAGE in the future with a subtle, on-screen suggestion at the moment they complete the call, to install or launch your PackageEx app.*

*FIG. 5A*

*Dear Ms. Pizzachain Marketing Manager:*

*We know how important a good calling experience is in your industry, and we would like to help you obtain information for improving your 1-800-PIZZAME caller experience.*

*On average each day, 2,500 users in our network call 1-800-PIZZAME on their smartphones. We can now provide to these customers a highly effective, on-screen survey on your behalf. By hiring us to administer a post-call survey right on the screen of a wireless caller's mobile device at the moment they call 1-800-PIZZAME, you are ensured the highest response rate in the industry, and the most accurate results.*

*A Survey Sales Technician is standing by to help. Contact us today to start more accurately measuring your calling experience!*

*FIG. 5B*

*Dear Shipping Industry Consultant:*

*Wouldn't you like to offer your shipping industry clients the ability to effectively steal market share from UPS, and supercharge their profits? We thought so!*

*Allow us to help you deliver your shipping industry promotions by way of our innovative "Toll-Free Coupon" service. Because our "Toll-Free Coupon" is only presented to an opted-in user of a mobile device when its user calls a target phone number, conversion rates are among the highest in the industry.*

*Also, our network of opted-in mobile devices is vast - over the last quarter, 100,000 opted-in mobile device users in our network called 1-800-ASK-USPS. We can target coupon delivery by a particular geographic location of the callers as well.*

*Bidding is open at www.toll-free-coupon.com for 1-800-ASK-USPS, as well as hundreds of other target toll free phone numbers, so get your bids in today! [\*Coupon content subject to our approval, based on terms of use.]*

*FIG. 5C*

PkgEx *PackageEx* Application Available.
1 800-722-5243
DIALING...
PackageEx Application Available.
    
*FIG. 6A*

ENHANCING INFORMATION DELIVERY TO A CALLED PARTY

BACKGROUND

Mobile phone users often become frustrated when interacting with call centers or other called parties, such as in noisy environments. Interactive voice response ("IVR") systems and call center agents tediously force users to navigate through verbal prompts or menus, which take excessive amounts of the user's valuable time.

The problem can be particularly acute when a user attempts to interact with a call center in a noisy environment. In such situations, background noise can overwhelm the user's verbal responses, making proper recognition of the user's utterances difficult, if not impossible. As a result, the user may repeatedly and unsuccessfully attempt interactions with the call center or called party. Unable to interact in a convenient or timely manner, the user may ultimately experience dissatisfaction and frustration.

An IVR system or a human agent may needlessly ask a user questions and waste the time of the user. For example, a user may spend minutes navigating through an initial series of questions or menus of an IVR system, such as those which ask a user for his language or other preferences, e.g., "press one for English, or marque numero dos para Español."

Given these and other problems, a need exists for a system that overcomes the problems, as well as provides additional benefits. Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

FIG. 3 illustrates exemplary system directory contents, as may be utilized by the smartphones and the server of FIG. 2.

FIGS. 5A-5C illustrate exemplary solicitations composed in accordance with the disclosed technology using the process of FIG. 4A. The solicitations promote a mobile device support application, a solicitation for the administration of a caller survey, and a solicitation for distributing an electronic coupon.

FIGS. 6A-6B illustrate representative user interface screens of a mobile device promoting a support application when the user calls 1-800-PACKAGE.

DETAILED DESCRIPTION

Figure 1:
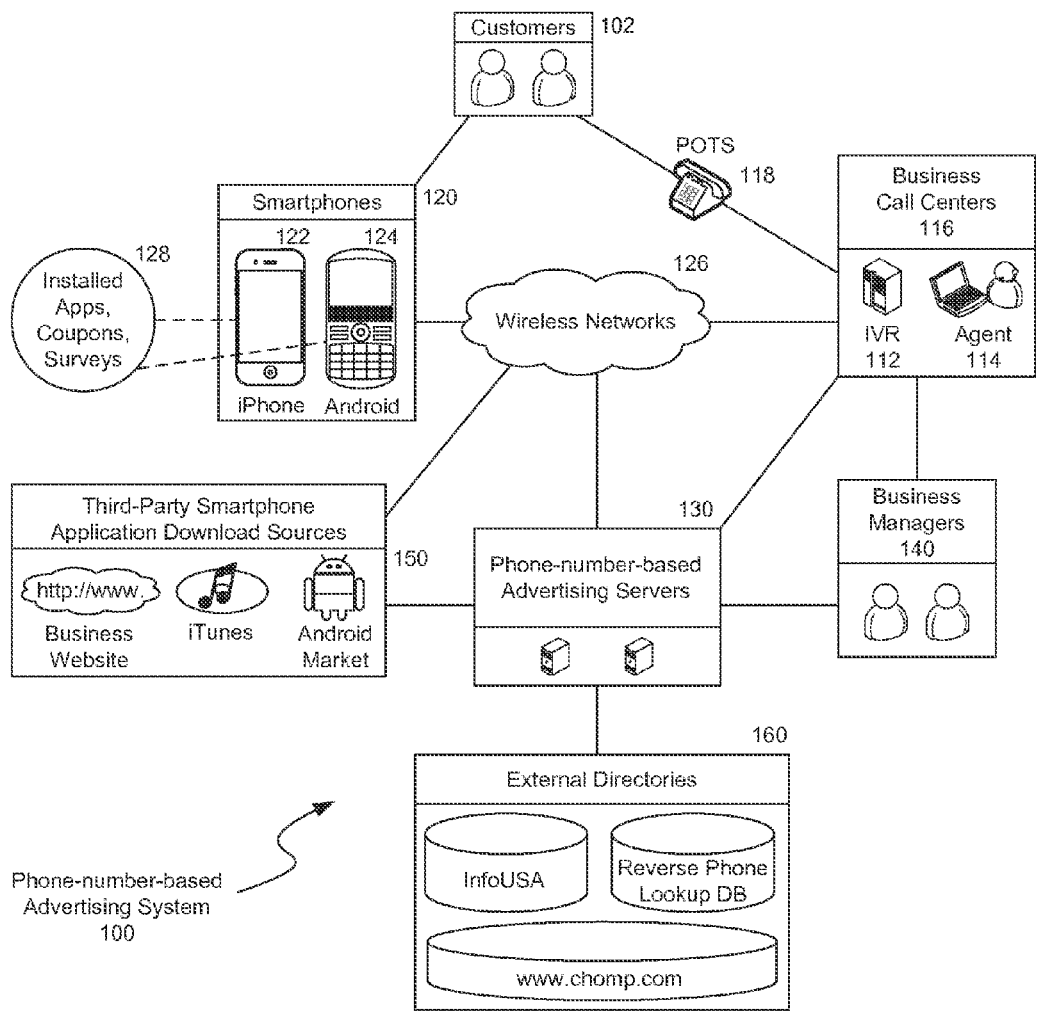
FIG. 1 is a block diagram of a phone number-based advertising system, including smartphones and a phone number-based advertising system server in accordance with one embodiment of the disclosed technology.

As will be explained in further detail below, one embodiment of the disclosed technology uses a programmed processor to compose an electronic service solicitation using mobile device call logs. The service, when delivered to a mobile device, can be a promotion of a mobile device support application, the presentment of a coupon, or the administration of a caller experience survey. The service is delivered in connection with the user making a call to a particular number on the mobile device. In one embodiment, a method for composing the solicitation includes selecting a business number, selecting a group of wireless subscribers, sending an information request to the mobile devices of the selected wireless subscribers, receiving affirmative responses from the selected wireless subscribers who recently called the selected business number, counting the affirmative responses, and using the count for composing the solicitation.

In various embodiments, the technology described herein enhances interactions between a mobile device caller and a call center by sending information, including the mobile device caller's location or preferences to the call center. The information can be stored on a computer-readable storage device, and transmitted from the mobile device caller to a call center controller. The sent or received information contains a caller identification, which allows the call center to match the rest of the sent or received information with a caller. In addition to the caller identification, a caller context entry associates additional data to the caller identification. The additional data includes at least one preference or location of the caller. Processor-based methods are disclosed to create, transmit, or utilize the data.

In at least one embodiment of the disclosed technology, a processor-based method facilitates interactions between a caller and a called party. The processor-based method includes caching one or more pieces of personal information on a mobile device, using a wireless telecommunications network to conduct a phone call with a third party, receiving a command from a user of the mobile device to deliver one or more pieces of the cached information to the third party during the phone conversation, and automatically delivering the requested one or more pieces of cached information to the third party. In one embodiment, the delivery takes place via the same outbound audio channel as is used for the phone call.

Various examples of the disclosed technology will now be described. The following description provides certain specific details for a thorough understanding and enabling description of these examples. One skilled in the art will understand, however, that the disclosed technology may be practiced without many of these details. Likewise, one skilled in the art will also understand that the disclosed technology may include many other features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the technology. Indeed, certain terms may even be emphasized below; however, any terminology intended to be interpreted in any restricted manner will be overtly and specifically defined as such in this Detailed Description section.

FIG. 1 is a block diagram of a phone number-based advertising system 100, including a number of mobile devices such as smartphones 120 (e.g., iPhone 122 or Android 124) and a phone number-based advertising system server 130.

Customers 102 utilize a variety of public switched telephone networks ("PSTNs") to reach business call centers 116 when in need of service or support from businesses. Examples of the PSTN connections include plain old telephone service ("POTS") 118 connections, Integrated Services Digital Network connections (not illustrated), and wireless network connections 126. The business call centers utilize human agents 114, interactive voice response systems 112, or a combination thereof to provide service to the customers 102.

Some customers have access to smartphones 120, which support installable applications, coupons, or surveys 128 that relate to the businesses. However, in many cases, the smartphones 120 initially lack these services (for example, when the support applications have not yet been installed).

Some customers 102 are able to utilize their smartphones 120 to directly access download sources 150 for installing applications on their smartphones. The download sources include: business websites; the ITUNES platform (provided by Apple Inc. of Cupertino, Calif.); and the ANDROID Market (provided by Google Inc. of Mountain View, Calif.) Some download sources 150 only support specific smartphone platforms. For example, ITUNES caters specifically to IPHONEs and other iOS devices, but does not support ANDROID devices. Some sources 150 are accessible by application browsing software that runs on smartphones 120. However, such application browsing software is traditionally tedious to use. Therefore, many customers 102 use smartphones 120 to call the business call centers 110, without discovering the businesses' support applications that can eliminate the need for them to call the business call centers 110 and enrich their customer experience.

One or more phone number-based advertising servers 130 operate to alleviate these problems. The phone number-based advertising servers 130 can use the wireless network 126 to access the call history of the smartphones 120, in order to determine which smartphones 120 called a particular business call center 110. Alternately or additionally, the servers 130 can communicate with the business call centers 110 to determine customers 102 who have not yet discovered a business's application, coupon, or survey.

In some embodiments, the advertising server 130 alternately or additionally identifies customers calling from smartphones that are likely compatible with one or more installable apps, coupons, or surveys. For example, an advertising server may determine a list of smartphones who have recently made calls to a particular business phone number and use an operating system that is compatible with a particular installable application, but who have not yet installed the application.

In some embodiments, the phone number-based advertising server 130 may send a solicitation to one or more business managers 140 related to the business call centers 110 with information describing how many of the smartphones 120 are calling one or more of the business call centers without utilizing an installed application ("app"), coupon, or survey 128. The solicitation, therefore, identifies a market segment that the business manager 140 may decide to target to efficiently deliver of one or more apps, coupons, or surveys. In some embodiments, the server 130 can assist a business manager with the delivery of the one or more of the apps, coupons, or surveys 128 to the target market segment. The advertising server 130 may download or obtain information about one or more support applications from the download sources 150. A smartphone 120 may then receive a suggestion to install a support application directly from the server 130. In some aspects, the server 130 will augment or modify a support application received from the download sources 150 prior to delivering it to a smartphone 120, in order to add additional functionality relating to the server 130 (for example, to enable, facilitate, or streamline future interactions between the smartphone 120 and the advertising server 130).

One or more external directories 160 can allow the phone number-based advertising servers 130 to associate phone numbers with businesses, keywords, and applications where the server 130 is not already aware of such associations. Exemplary third-party providers of this data include the InfoUSA business directory service provided by INFOGROUP, Inc. of Papillion, NE; the "chomp" iTunes application search service provided by APPLE, Inc.; and reverse phone lookup databases, which return corresponding business names, addresses, contact information, etc. when provided a business phone number.

The business managers 140 can use the advertising server 130 to access information about the smartphone calling customer population who has called their business numbers, or the numbers of a competitors or other businesses of interest (e.g., in the same industry, related by one or more keywords, etc.). In some cases, one or more business managers 140 will utilize the advertising servers 130 to offer the advertised services to the smartphones 120. The service may be offered in a number of ways—retroactively, e.g., to smartphones who have already called a business number in the past, or in the future, e.g., to smartphones around the time when they call the business number in the future. Around the time when a smartphone calls the business number can be: before the call (e.g., after a request to call the number is dialed or otherwise requested, but before the call to the business call center connects); during the call (e.g., after the call has been originated and before it is terminated); or after the call (e.g., after the call has been terminated). In various aspects, the business managers 140 may specify various details to the advertising severs 130 relating to service offer, such as which service the business managers are requesting to be offered, which of the smartphones 120 should be targeted with the offer of the service, when the service should be offered, and other details regarding how the advertising servers 130 should offer the service, etc.

Figure 2:
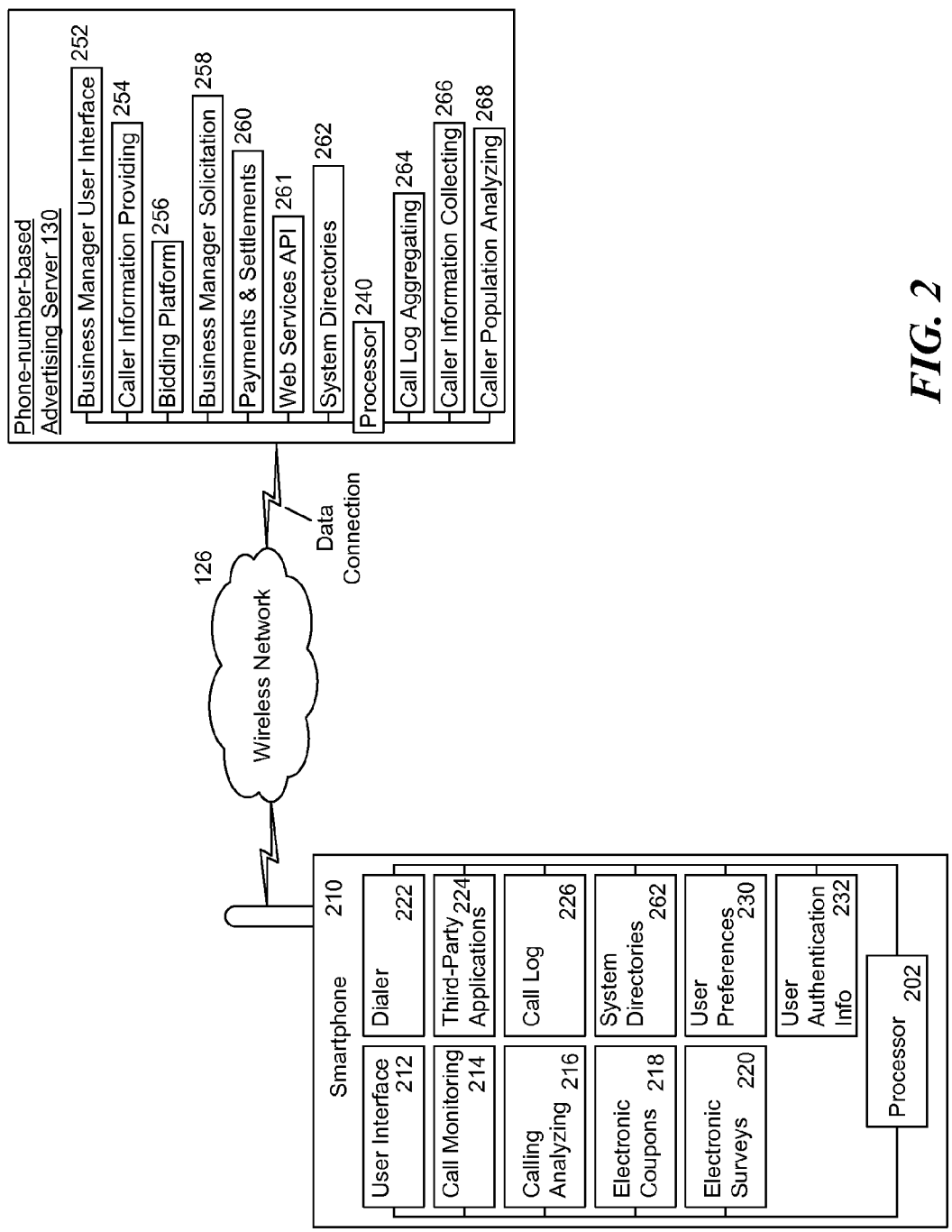
FIG. 2 is a block diagram illustrating additional detail of the smartphones and the phone number-based advertising system server of FIG. 1 in accordance with one embodiment of the disclosed technology.

FIG. 2 is a block diagram illustrating additional detail of the smartphones 120 and the phone number-based advertising system servers 130. A representative smartphone 210 connects to the server 130 by way of the wireless network 126.

The representative smartphone 210 includes a processor, which executes instructions to perform various actions and functions of the smartphone. The instructions are typically stored in a smartphone memory, or other storage device residing on the smartphone 210. The smartphone 210 is capable of having included or installed one or more electronic coupons 218, electronic surveys 220, and third-party applications 224 (e.g., support applications). The smartphone 210 additionally includes a user interface 212 (e.g., a graphical user interface), a dialer 222 (e.g., a dialer application allowing the user to dial a phone number in order to make a phone call), a call monitoring component 214 (e.g., an operating system alert service providing a message when a user places a call to one or more phone numbers that are being monitored), a processor 202, and a call analyzing component 216 (e.g., a component that may receive a call monitoring alert or access a call log 226 to determine a user's calling activity to one or more business numbers).

The call log 226 maintains at least some of the calling activity history for the smartphone 210. The call log typically includes information such as which numbers were recently dialed, whether the calls were successfully connected, when the calls were connected, the durations of the connected calls, which inbound calls were recently received by the smartphone 210 and, when available, from which phone numbers the calls were received, whether inbound calls were missed, and so on.

The smartphone 210 may also store data for one or more user preferences 230, for example, a user's name, home address or the addresses of other locations, typically preferred schedules, preferred languages, and so on. Such preferences may be automatically collected by an operating system or an application of the smartphone, or may be specified by the user explicitly (e.g., via the user interface 212). Additionally, the smartphone 210 can include user authentication information 232, and other personal information, such as the user's account numbers, passwords, voice signatures for use with voice biometric authentication, and so on.

If agreed to by the owner of the smartphone 210, the phone number-based advertising server 130 can access the call history of the smartphone by looking for one or more business numbers in the outgoing call log 226. Communications between the server 130 and the smartphone 210 occur over a wireless network data connection in order to accomplish this. For example, the call analyzing component 216 may automatically receive an appropriately routed binary SMS message transmitted by the server 130 to the smartphone 210 across the wireless network 126. Additionally or alternately, bidirectional communications may be accomplished using Session Initiation Protocol ("SIP"), Internet Protocol version 6 ("IPV6"), or any other delivery technology known in the art for communicating data across a wireless network 126.

An exemplary phone number-based advertising system server 130 contains a business manager user interface 252, e.g., to facilitate interactions between the server and business managers. In some aspects, the business manager user interface 252 may be in the form of a Web-based application that is accessed across the internet. A Web services application programming interface ("API") 261 exports various functionality to applications on remote computers, such as the personal computer of a business manager that is connected to the internet. In some aspects the API 261 could interface with smartphones 120. The server 130 contains caller information providing software 254, which allows the business managers to receive information about callers, such as the smartphone 210 or users of the smartphone 210, and in some cases other customers 102 who call business call centers 110. The communication linkage between the server 130 and a call center may utilize a public network (such as the internet) or a private network. In some aspects, the server 130 may even be located within the premises of a call center. The server 130 may obtain information about callers by sending and receiving messages to the smartphone 120 or the business call centers 110.

In one embodiment, the advertising server 130 contains a bidding platform 256 that the business managers can use to bid against each other for services solicited, advertised, promoted, offered, or delivered by the server 130. A business manager solicitation component can compose, send, or present solicitations (advertisements) to the business managers 140. A payments and settlements component 260 may present bills and statements to the business managers, and receive payments from the business managers, such as those who accept the solicitations, or submit winning bids to the bidding platform 256. In some aspects, the payments and settlements component 260 may additionally or alternately be configured to receive payments from customers 102. The payments and settlements component may also accrue balances, such as additional balances owed as a result of the offering or delivery of a service to a smartphone 210 (e.g., delivery of a support application 224 to the smartphone as part of providing an electronic service to one of the business managers 140). Various components of the server 130 may utilize a call log aggregating component 264, a caller information collecting component 266, and a caller population analyzing component 268. For example, the bidding manager solicitation component 258 may compose a solicitation that includes a number of callers in a population who recently dialed a particular business phone number. The population can be analyzed by the analyzing component 268, determined from aggregations produced by the call log aggregating component 264 and information collected from the caller information collecting component 266.

A processor 240 residing on the server 130 executes server instructions to perform various actions and functions of the server 130. These server instructions are typically stored in a memory or other storage device (not illustrated) residing on the server 130.

SYSTEM DIRECTORIES

In various embodiments of the disclosed technology, one or more system directories 262 may be present on the server 130 or the smartphone 210. The directories assist in the operation of various components of the server 130 or the smartphone 210.

For an example utilization of the system directories 262 within the smartphone 210, the monitoring component 214 can utilize the directories to determine which phone numbers to monitor, or what to do in response to monitored events relating to a phone number (e.g., a call to the monitored phone number is requested, a call to the monitored phone number is completed, an incoming call from the monitored phone number is missed, etc). For example, the monitoring component 214 can use the directories 262 to determine whether to suggest an application be installed or launched (and which application to suggest) in response to a monitored phone number being dialed. Additional details regarding the operation of the monitoring component 214, including determining if a called number is in a list (e.g., in a directory) and what actions to perform in response, is further detailed in U.S. Pat. No. 7,539,484, entitled "Method and System for Enhancing Voice Calls, Such as Enhancing Voice Calls with Data Services" dated May 26, 2009, the content of which is hereby incorporated in its entirety. Additional or alternate criteria may be applied when determining when to display interactive content (e.g., when to prompt the user to suggest an application, survey, or coupon), which are further detailed in U.S. Pat. No. 7,756,545, entitled "Method for Performing Interactive Services" dated Jul. 13, 2010, the content of which is also hereby incorporated in its entirety.

For an example utilization of the system directories 262 within the server 130, the server can utilize the directories to determine: which download sources 150 to access directly, or to point to (such as by a deep link); which business managers 140 to contact; how to associate business managers 140 with called numbers (e.g., reaching a business call center 110); and so on.

In some embodiments, the system directories 262 may be distributed across, or duplicated on the smartphone 210 and the server 130. The external directories 160 may provide the system directories 262, or provide data from which the system directories are derived.

FIG. 3 illustrates exemplary system directory contents, as may be utilized by the smartphones 120 and server 130. An application directory by phone number 302 can look up an application (such as a deep link to a download source 150), when given a business phone number. For example, such a deep link can be utilized by the smartphone 210 to determine whether to suggest that an application be installed when a number is dialed.

In other embodiments, additional or alternate information may be contained in the application directory by phone number 302. For example, the directory may contain text or other content to present when suggesting that an application be installed. As another example, the directory may contain information about whether the suggestion should be triggered when the call is requested to the number, when the call is completed to the number, or at some time after the call is completed to the number (e.g., 20 minutes after the call has been completed, or at 7:00 PM after the number was dialed, when the user may be more likely to be responsive to the suggestion), location criteria that may be applied in determining when to trigger the suggestion (e.g., the user is at home, as evidenced by a global positioning signal, nearby Wi-Fi access point, cellular tower identifier for which a wireless network connection is established, and so on). As another example, the directory may contain a link to a coupon or survey that should be presented or suggested instead of an application when a user calls a number in the directory.

In some cases, the additional or alternate information may not be contained remotely, e.g., in a download source 150, and may be accessed (e.g., using the download source deep link) when it is needed, so the additional or alternate information need not be locally stored on the smartphone 210.

A keyword directory by phone number 304 can be used to look up one or more keywords associated with a phone number. An application directory by keyword 306 can be used to look up an application name and a corresponding download or deep link when given one or more keywords. A smartphone 210 can first use the keyword directory by phone number 304 to look up one or more keywords associated with a phone number that was just dialed, and then use the application directory by keyword 306 to determine if it should suggest installing or launching an application.

A caller directory by dialed phone number 308 can be used to store and look up a list of callers who have recently dialed a phone number, when given the phone number. For example, it can be used by the server 130 to store and retrieve which smartphones 120 called a particular number.

Figure 4A:
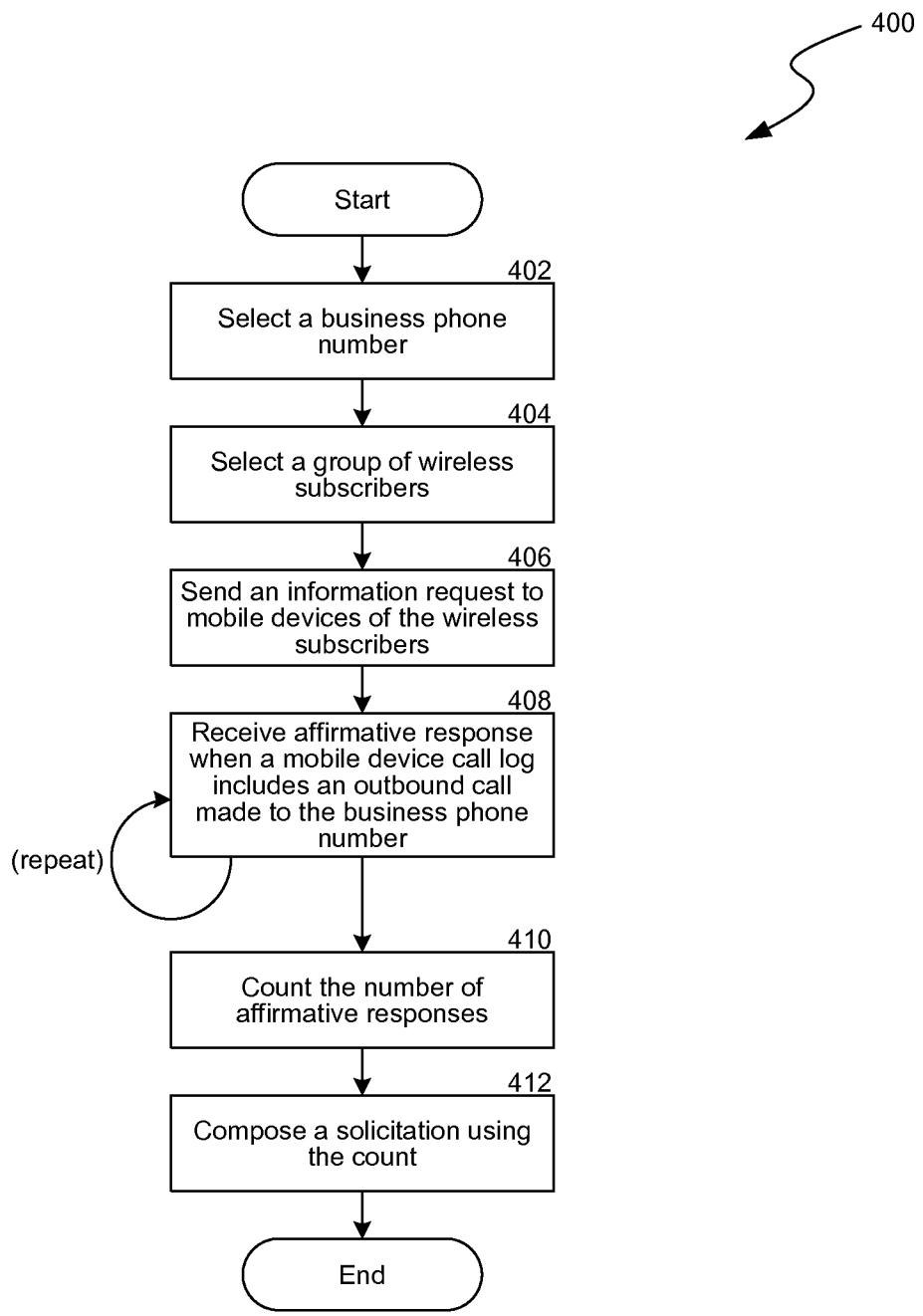
FIG. 4A is a flow diagram of a process for composing a solicitation for various electronic services based on mobile device call logs in accordance with one embodiment of the disclosed technology.

FIG. 4A is a flow diagram of a process 400 for composing a solicitation for offering various electronic services based on mobile device call logs in accordance with one embodiment of the disclosed technology. Beginning at a block 402, a business phone number is selected. This may be determined by random, determined by taking the next one of multiple phone numbers in a list being sequentially processed, determined by request of a user (such as a business manager's request), and so on.

Proceeding to a block 404, the process 400 selects a group of wireless subscribers. For example, it may select a subset of the smartphones 120 with which a calling analyzing component 214 can communicate. In some aspects, a smartphone 120 may not be configured to provide access to its call log unless a user of the smartphone has installed a particular application, or agreed to permit access to instances of one or more business phone numbers appearing in its call logs or calling history.

In some aspects, the server 130 keeps track of which smartphones 120 are configured to provide access to their call logs in such a manner. For example, when the calling analyzing component 214 becomes newly configured in such a manner on a smartphone, the newly configured smartphone may send a message to the advertising server 130 for indicating its new configuration.

Proceeding to block 406, the advertising server 130 sends an information request to the selected group of smartphones. For example, it could send a binary SMS to each one of the group, which would be automatically received by the configured call analyzing components 216. In some aspects, the information request may contain the business phone number selected in block 402. In some aspects, the business phone number may be implied by the request, or may be included within a range of numbers sent by the information request. When a configured smartphone receives the information request, the call analyzing component 216 may look use the call log 226 to determine if the selected business phone number has been recently called, e.g., if the number is in the outgoing call log. In some aspects, the calling analyzing component may perform additional processing, such as determining if an electronic coupon 218, electronic survey 220, or support application 224 that is associated with the selected business phone number is already installed or stored on the smartphone 120. For example, the calling analyzing component 216 may perform this determination by consulting the directory 302 to determine the application associated with the selected phone number, and determining if that application is already installed on the smartphone 120. In some aspects, the smartphone 120 may only respond positively if the selected phone number has been recently dialed (e.g., is in the call log 226) and if no application associated with the selected phone number is already installed. If the application is already installed, the smartphone 120 may indicate this in a negative response to the server. If the phone number has not been recently dialed, the smartphone 120 may indicate this in a negative response to the server. In some aspects, the server 130 may interpret a lack of a response from a smartphone within a certain period of time as a negative response, so that no responses need be sent across the wireless network 126 to communicate the response being negative. A person with skill in the art will appreciate that additional various criteria could be applied by the smartphone or by the server to further determine whether a positive response will be interpreted as being received from the smartphone, or not.

Proceeding to block 408, the positive (affirmative) response is received from a smartphone by the server 130. Block 408 loops as additional positive responses are received from other smartphones. Proceeding to block 410, the server 130 counts the number of received positive responses. Proceeding to block 412, the server 130 uses the counted number for composing a solicitation. For example, the server may include the count within the solicitation, or a percentage which is calculated based on the count, etc. The server may consult internal or external directories to determine the recipient of such a solicitation. The solicitation targets an electronic service associated with the selected number.

Figure 4B:
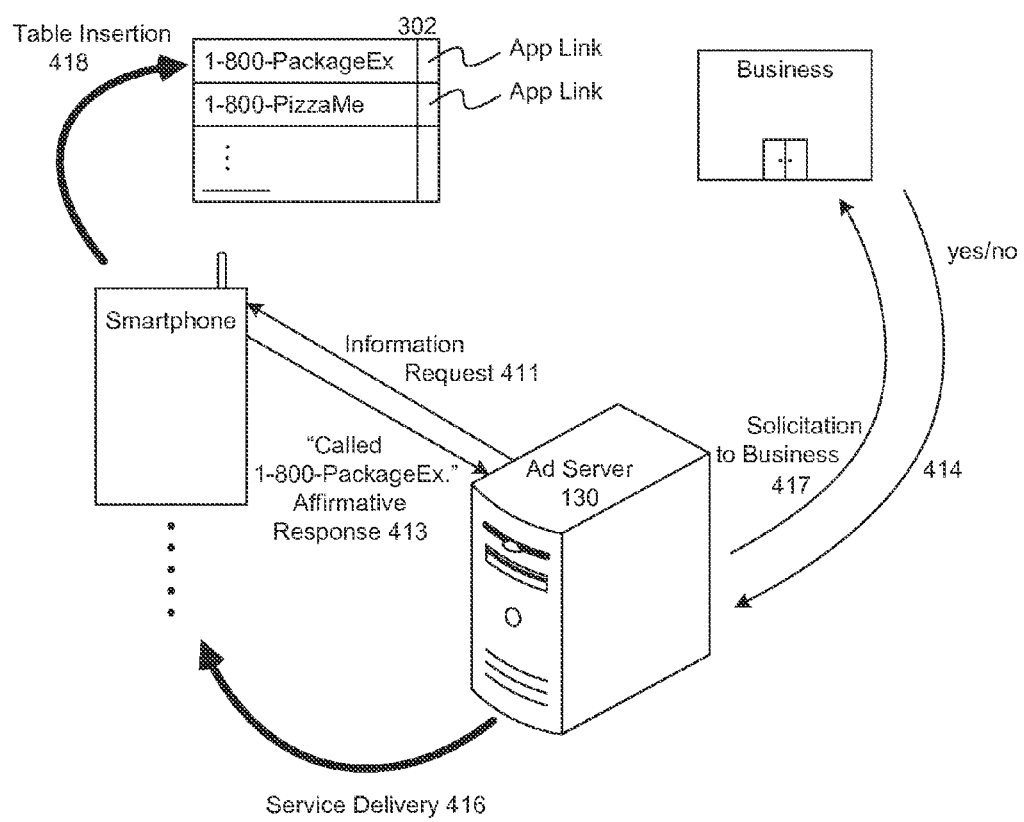
FIG. 4B illustrates how the process of FIG. 4A can operate in accordance with an embodiment of the disclosed technology.

FIG. 4B illustrates an example execution of the process 400. In this example, "1-800-PAC-KAGE" is selected in block 402, because it is represents a number found in a business directory that has not previously been assessed by the server 130. A group such as 150,000 wireless subscribers that are known by the advertising server 130 to have a component 216 configured to analyze call logs based on information requests received from the advertising server 130 is automatically selected in block 404. In block 406, an information request 411 is delivered by the advertising server 130 to the wireless subscribers, e.g., by delivery of a message automatically received and processed by the calling analyzing components 216 of the 150,000 mobile devices. An exemplary calling analyzing component of one of the mobile devices checks the call history in the call log for "1-800-PAC-KAGE" (or 800-722-5243) and finds a corresponding entry, so it automatically responds back to the advertising server with an affirmative response 413, received in block 408. In the example screen, 15,000 affirmative responses (10%) are received by the advertising server 130. In block 410, the advertising server counts the number of affirmative responses. The advertising server keeps track of the subscriber identifiers for which the affirmative responses are received. In block 412, a solicitation message 417 is composed, offering the promotion of a "PackageEx" support application, which is exemplified in FIG. 5A.

Referring back to FIG. 4B, the solicitation is delivered to a business representative for PackageEx. The advertising server 130 sends the solicitation to PackageEx, which offers to send the users an offer to download an application. If PackageEx agrees as is illustrated in step 414, then messages are sent to the 15,000 affirmatively responding smartphones suggesting that they download and install the offered application in step 416. As is illustrated in the example, messages may be sent to the other smartphones in the group of 150,000 to configure them for suggesting to install a PackageEx app the next time 1-800-PACKAGE is called.

In some embodiments, the server configuration messages sent by the server alternately or additionally configure mobile devices to suggest launching an already installed support application. Because a smartphone user may have installed a large number (e.g., hundreds) of third-party applications, the user is likely to forget, at least some infrequently used installed applications. Accordingly, such a suggestion or reminder to launch an already installed support application at a contextually relevant time (e.g., when the user calls the business's phone number) can be useful for facilitating the rediscovery of that business's support application.

In some embodiments, the smartphone may even prompt the user whether to, in the future, automatically intercept calls to the business's phone number, and automatically launch the business's support application, rather than proceeding with the call. This can be beneficial to the user as a convenient means for launching a support application based on a dialed phone number.

As is illustrated by step 418, a deep link compatible with the smartphone application is inserted into an application directory by phone number 302 stored in the smartphone, so that the next time 1-800-PAC-KAGE is called, the call monitoring component presents the suggestion to install the PackageEx app. In some embodiments, the server may send multiple deep links for different smartphone configurations or platforms (e.g., different operating systems) and the smartphone can automatically use the correct, compatible deep link (e.g., depending on whether the smartphone is ANDROID-compatible, iOS-compatible, etc.). In other embodiments, the server maintains lists of the smartphones' configurations or platforms (e.g., by maintaining separate lists for ANDROID-compatibility, iOS-compatibility, and so on) and the server could then send a compatible deep link to each of the smartphones based on its known compatibility information.

Figure 6B:
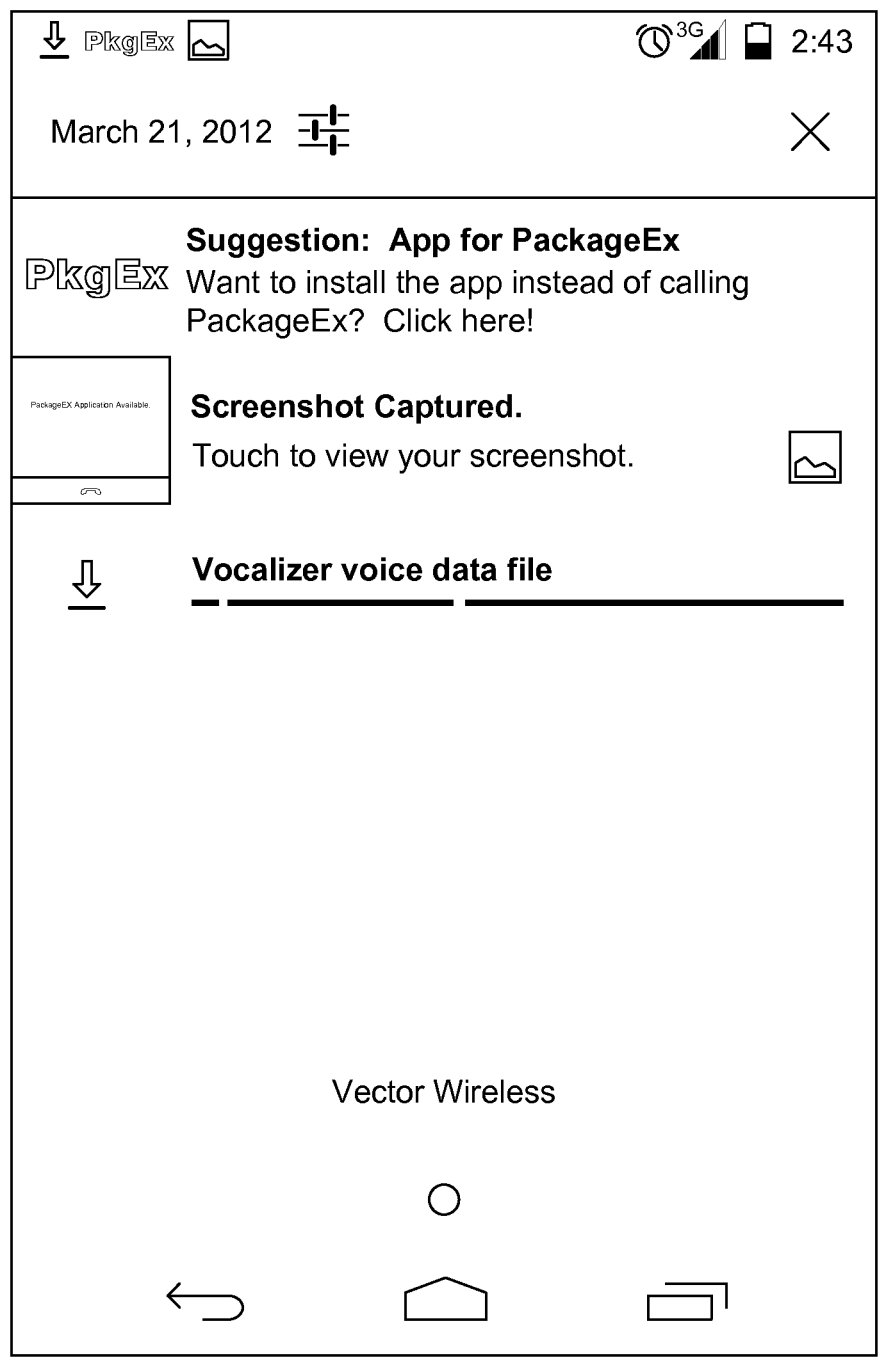

FIGS. 6A-6B illustrate exemplary user interface screens of a mobile device promoting a support application when the user calls 1-800-PAC-KAGE. FIG. 6A shows a screen where the number 1-800-722-5243 (1-800-PAC-KAGE) has been dialed, and while the phone line is still ringing, a notification "PackageEX Application Available" is presented in the middle (as well as at the top) of the screen. The notification may be presented for a limited time duration (e.g., disappearing after 2 seconds), and may fade in and out gradually, so as to not be too obtrusive if the caller is intent on continuing with the phone call rather than immediately viewing the suggestion. The caller may tap on the suggestion to get more information about, or to install, the PackageEx support application.

FIG. 6B shows a screen where a notification is being presented after the user has completed the 1-800-722-5243 call, such as after hanging up on the call. Here, the notification is presented with additional detail: "Want to install the app instead of calling PackageEX? Click here!". Since the user is done making the call, a more obtrusive and detailed suggestion may be used. The suggestion may remain on the screen until the user responds to the suggestion, or otherwise navigates away. If the user taps on the suggestion, the PackageEx application may proceed to be downloaded and installed.

The PackageEx support application being suggested here could provide all or some of the support functions that 1-800-PACKAGE call center does. For example, it could be useful for checking a shipping delivery status. Because the support application can have abilities beyond what is available via a PSTN communication (e.g., visual information presented on the display screen, more or other user input modes being available, such touchscreen input, querty keyboard input and so on), it can provide the user with a superior customer experience. Because using the support application doesn't require tying up phone lines, it can save the user on calling minutes, which may conserve some wireless network resources. In some scenarios, the support application could be useful when no cellular network coverage is present but another communication channel such as Wi-Fi is present (such as when a user is traveling by airplane). Furthermore, because using the PackageEx app reduces the number of callers who call the call center for 1-800-PACKAGE, less staff (e.g., a fewer number of agents 114) may be needed. Accordingly, enhancing the discoverability of a business's support applications can reduce business expenses.

When the user responds to the suggestion to install an application illustrated in FIG. 6A (e.g., by tapping on the suggestion appearing in FIG. 6A), a similar type of suggestion as that illustrated in FIG. 6B may then appear on the screen.

As is illustrated in an example above, a delivery of a service may be requested by a business manager 140, such as in response to a solicitation. The server 130 may deliver one of the advertised services. For example, the server 130 can send a message (such as a binary SMS) to a smartphone 120 being offered the service, that causes the user interface 212 to present a suggestion to install a third-party application. This suggestion may occur at a time determined by the server (e.g., by timing when the message is sent to the mobile device) or at a time determined by the smartphone (e.g., by using the call monitoring component 214 to trigger the suggestion the next time that the user places a call to the selected business phone number).

In other aspects, a coupon or a caller survey may be presented on the user interface 212 instead of, or in addition to, the suggestion to install the third-party application. FIGS. 5B-C illustrate other exemplary solicitations composed using the process of FIG. 4A, including a solicitation for the administration of a caller survey, and a solicitation for distributing an electronic coupon.

The solicitation provided by the advertising server 130 may include details such as: what items should be presented or suggested (e.g., an application download deep link or other uniform resource locator); whether the presentment or suggestion should occur when a user requests a call to the selected business phone number, but before the call is originated on the PSTN; whether the presentment or suggestion should occur instead of originating (or continuing) a call to the selected business phone number that is requested (or originated on the PSTN); or whether the presentment or suggestion should occur after the completion of a call to the selected business phone number (optionally including whether a delay or additional criteria should be applied to the timing of the suggestion, such as when the mobile device is at a particular location), etc. By presenting particular offers to targeted users at particular times or scenarios, the conversion rate (the change that the user will use the coupon, take the survey, or install or launch the suggested support application) is likely to be much higher than otherwise. By targeting users who have called the selected business number, or who have compatible smartphones, it allows business managers 140 to focus the delivery of a service at an especially valuable customer (or potential customer) segment.

DELIVERY OF CACHED INFORMATION

Figure 7:
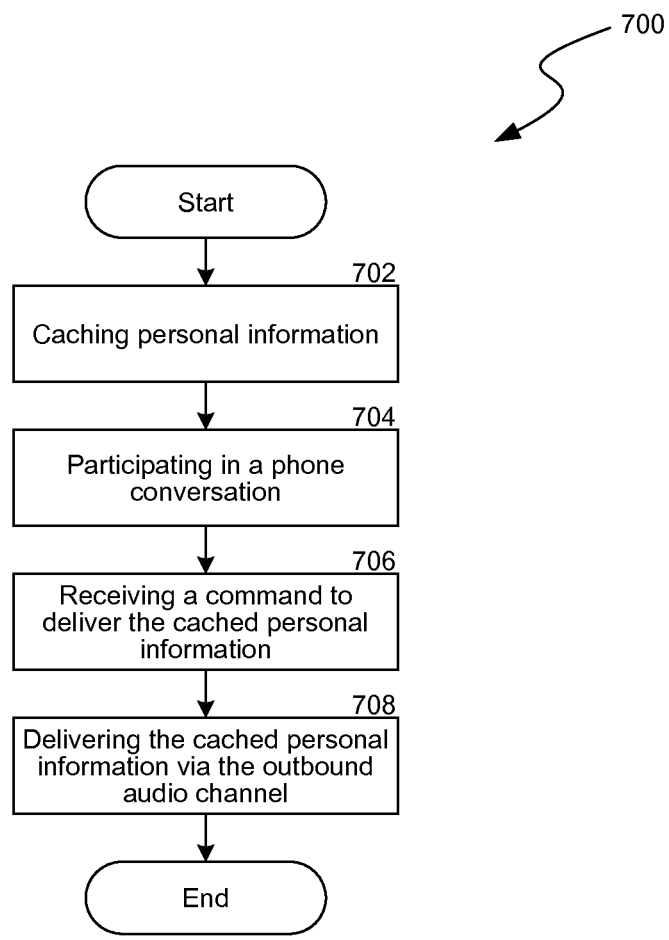
FIG. 7 is a flow diagram of a process for delivering cached personal information from one party to another during a phone call in accordance with the disclosed technology.

FIG. 7 is a flow diagram of a process 700 for delivering cached personal information from one party to another during a phone call in accordance with another aspects of the disclosed technology. Starting at a block 702, the process caches personal information, such as on the representative smartphone 210. For example, the smartphone 210 can utilize a microphone to sense utterances received from the user of the smartphone, and record the sensed utterances in a storage device, such as on-board flash memory.

The recording may occur during a live phone call to a first called party. For example the smartphone 210 may automatically associate and record an identifier for the first called party (e.g., the phone number of the first called party) with the cached personal information. The cached personal information may comprise a single piece of information (e.g., a recording of the user's name), or multiple pieces of information (e.g., a first recording of the user's name, and a second recording of the user's social security number). The smartphone may prompt the user whether to record personal information before doing so, or may prompt the user whether to save or discard automatically recorded personal information. The smartphone may prompt the user to identify the cached information, e.g., to identify a recording of a user's spoken name as a user's full name, or the user's first name, the user's social security number, airline frequent flyer account number, and so on. The smartphone then stores the identification along with the cached information. The smartphone 210 may monitor the audio input for any repeated phrases and cache the repeated phrases, as they could indicate difficulty in communication (e.g., a called party, such as an IVR, might ask the caller to repeat stating the caller's account number when the initially stated account number was not accurately recognized for reasons such as excessive background noise).

The recording may also occur when there is no live phone call. For example, the user may select a menu option to activate an information caching feature of the smartphone 210. The information caching feature may then prompt the user to speak the personal information, to optionally identify what it is, and if desired to repeat the operation of the caching feature to record pieces of information with different identifications. In some aspects, the information caching feature will prompt the user to specify which called or callable parties (e.g. phone numbers) should be allowed access to some or all of the cached information.

When prompting the user to identify a piece of information, the smartphone 210 may present the user with a list of commonly identified pieces of personal information, such as: first name, last name, full name, social security number, last four digits of social security number, home address, home city and state, work address, and so on. Alternately or additionally, the smartphone 210 may process the recorded information to determine what its identity most likely is. For example, if the recorded information consists of a sequence of first group of three utterances, a pause, a second group of three utterances, a pause, and a third group of four utterances, the smartphone 210 may determine that it is likely a phone number with area code. In some aspects, the smartphone will automatically store an automatically determined identification (e.g., the user's mobile phone number, with area code) without prompting the user for its verification.

In some aspects, audio information may be converted to textually represented information before being stored. For example, the process 700 can utilize a voice-to-text decoder to determine which question an IVR asked (e.g., "what is your name?") in order to associate the IVR question with a recorded piece of information. In other aspects, the user can directly enter personal information in a textual manner (e.g., by the use of a keyboard such as may be found on a touchscreen, or by the use of a touch sensor to input the text using handwriting recognition, etc.).

Proceeding to a block 704, the process participates in a phone conversation. For example, the user of the smartphone 210 may dial a phone number to make a call, which is answered by a called party. In some aspects, the process will additionally monitor which number is being called, or perform a check to verify that a particular number is called.

Proceeding to a block 706, the process receives a command to deliver the cached personal information to the other party of the phone conversation. In some aspects, this command may be received after the call is requested (e.g., the user may select an option representing the command that is presented on a graphical user interface of the smartphone 210), before the call is requested (e.g., by the user selecting that the information be delivered to future calls made to a particular phone number), or as part of a request to make a call (e.g., the act of dialing a particular phone number previously associated with the cached information may be the command to deliver the cached information to the called party).

Proceeding to a block 708, the process delivers the cached personal information via the outbound audio channel used for the phone call or via another communication link.

For example, after the user dials a phone number that is answered by an IVR, and after the IVR asks the caller to say the caller's account number, the user may then select an option on the smartphone 210 to deliver the cached personal information for the user's account number for the called party. In this scenario, the smartphone 210 immediately plays back a cached, recorded audio file of the user's voice stating his account number to the IVR. In some embodiments, the microphone of the smartphone 210 is muted during the audio playback, so that background noise will not interfere with the communication if the user is in a noisy environment. In some embodiments, the speaker of the smartphone 210 may be silenced so it does not relay the audio information being played back, so that others in proximity of the smartphone 210 will not overhear personal information being played back. This way, the user can conduct transactions with an IVR while maintaining his privacy. If the information is recorded in a textual format, the smartphone 210 can be translate it to audio using a text-to-speech converter, and the synthesized speech can be played on the outgoing audio channel of the phone call.

In some embodiments, if a party being called is recognized as being an IVR for which non-audio communications are available (e.g., by recognition of the number dialed matching a number), the cached personal information may be delivered to the IVR using a non-audio communications channel. For example, the smartphone may open a secured hyper text transfer protocol connection (HTTP/S) with the IVR, or an intermediary server (e.g., the server 130) which can relay a message to the IVR, in which the cached personal information can be delivered to the IVR without the use of the audio channel.

In some embodiments, for security purposes, the smartphone 210 may perform authentication on the user prior to delivering the personal information to the outside party of the phone conversation. For example, it may analyze an audio signal that was recently received on a microphone (e.g., spoken by the user) for verification that the vocal characteristics match a profile of an authentic user's characteristics, or may otherwise utilize voice biometrics for confirming the identity of the user.

In some embodiments, the process 700 could utilize a voice to text decoder for the purposes of automatically judging what information the IVR is looking for. For example, if the IVR asked "What is your name?" Then the process 700 could use that as a queue to control the timing of when a recorded user name is automatically played to the IVR. Alternately, the IVR asking this question might be detected by the process 700, and cause it to present a button on the user interface of the mobile device (e.g., on a touchscreen display), which the user can, if desired, press to cause the mobile device to play back a recording of the user's name to the IVR.

Figure 8:
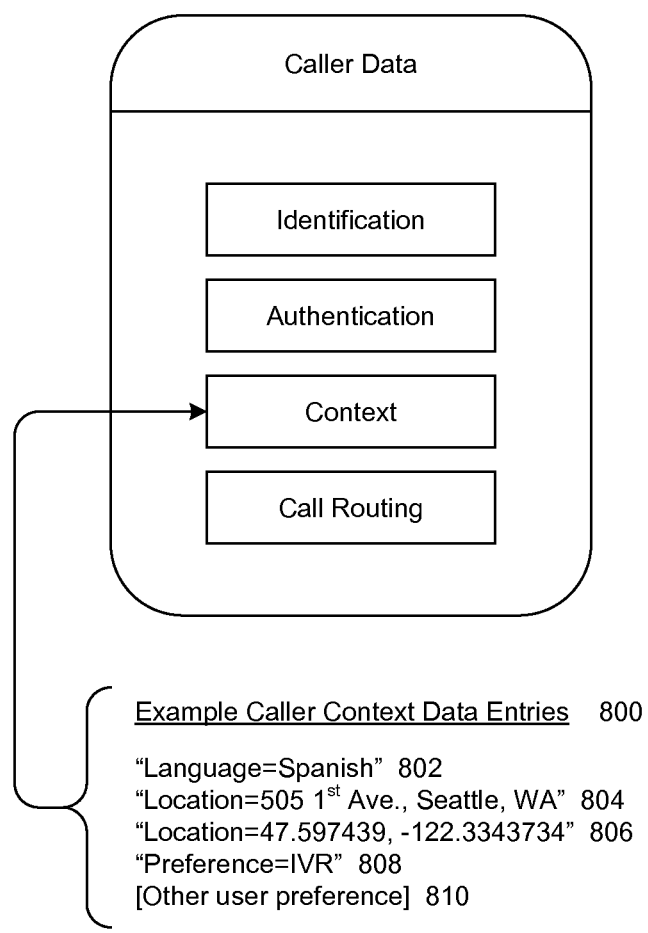
FIG. 8 illustrates exemplary caller context data that may be created, transmitted, stored, or utilized by a computer-telephony system for providing assistance to a user of a mobile device.

FIG. 8 illustrates exemplary caller context data 800 that may be created, transmitted, stored, or utilized by a computer-telephony system for providing assistance to a user of a mobile device.

The computer-telephony system is further detailed in U.S. patent application Ser. No. 13/424,093, filed Mar. 19, 2012, entitled "Mobile Device Applications for Computer-Telephony Systems", the content of which is hereby incorporated by reference in its entirety. The computer-telephony system described therein can be adapted with the phone-number based advertising system 100 to combine elements, features, and capabilities.

The example caller context data 800 includes a data entry 802 specifying Spanish as a preferred language of a caller. This can eliminate the need for the IVR 112 to ask the user of the representative smartphone 210 which language the user prefers to use, as well as the need for the user to respond to such a verbal inquiry.

The example caller content data also includes an address location 804 and a latitude and longitude coordinate location 806. Such locations may be derived from the global positioning system of the representative smartphone 210, or stored location preferences in the smartphone (e.g., a home address or business address that may have been recorded by the operating system or an application of the smartphone).

The example "IVR preferred" preference 808 could be useful to indicate that the user of the smartphone 210 actually wants to communicate with an IVR. For example, if the use is driving in a car in traffic, the user may not be in a hurry. If the user is familiar with the IVR system, the user may prefer to interact with the predictable dialogue provided by the IVR, so the user is not inordinately distracted from the task of driving the car by unexpected interactive dialogue that a human agent 114 may ask.

A wide variety of other preferences 810 may be advantageously communicated from the smartphone 210 to the call center 110 or IVR.

CONCLUSION

Note that "call center" as referred to herein may be a logical rather than a physical entity. For example, the agents, servers, or other components of the systems logically comprising the call center may not be physically located in one particular location, but may be distributed across multiple locations. In some cases, the servers and components may be arranged differently than are indicated above. Single components disclosed herein may be implemented as multiple components, or some functions indicated to be performed by a certain component of the system may be performed by another component of the system. Further different components may be combined. In various embodiments, components on the same machine may communicated between different threads, or on the same thread, via inter-process communication or intra-process communications, including in some cases such as by marshalling the communications across one process to another (including from one machine to another), and so on.

Although not required, aspects of the disclosed technology are described in the general context of computer-executable instructions, such as routines executed by a general-purpose data processing device, e.g., a server computer, wireless device, smartphone, or personal computer. Those skilled in the relevant art will appreciate that aspects of the disclosed technology can be practiced with other communications, data processing, or computer system configurations, including: Internet appliances, hand-held devices (including personal digital assistants (PDAs)), tablet computers, wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer", "server", "host system", and the like are generally used interchangeably herein, and refer to any of the above devices and systems, as well as any data processor.

Aspects of the technology can be embodied in a special purpose computer or data processor that is specifically programmed, configured, or constructed to perform one of more of the computer-executable instructions explained in detail herein. While aspects of the disclosed technology, such as certain functions, are described as being performed exclusively on a single device, the disclosed technology can also be practiced in distributed environments, which are linked through a communications network, such as a Local Area Network (LAN), Wide Area Network (WAN), or the Internet. In a distributed computing environment, program modules may be located in both local and remote memory storage devices.

Aspects of the disclosed technology may be stored or distributed on non-transitory computer-readable media, including magnetically or optically readable computer discs, hard-wires or preprogrammed chips (e.g., EEPROM of flash semiconductor chips), nanotechnology memory, biological memory, or other data storage media. Alternatively, computer implemented instructions, data structures, screen displays, and other data under aspects of the disclosed technology may be distributed over the Internet or over other networks (including wireless networks), or they may be provided on any analog or digital network (packet switched, circuit switched, or other scheme).

Unless the context clearly requires otherwise, throughout the description and the claims, the words "comprise", "comprising", and the like are to be construed in an inclusive sense, as opposed to an exclusive or exhaustive sense; that is to say, in the sense of "including, but not limited to". As used herein, the terms "connected", "coupled", or any variant thereof means any connection or coupling, either direct or indirect, between two or more elements; the coupling or connection between the elements can be physical, logical, or a combination thereof. Additionally, the words "herein", "above", "below", and words of similar import, when used in this application, refer to this application as a whole and not to any particular portions of this application. Where the context permits, words in the above Detailed Description using the singular or plural number may also include the plural or singular number respectively. The word "or", in reference to a list of two or more items, covers all of the following interpretations of the word: any of the items in the list, all of the items in the list, and any combination of the items in the list.

The above Detailed Description of examples of the disclosed technology is not intended to be exhaustive of to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks, may be deleted, moved, added, subdivided, and/or modified to provide alternative or subcombinations. Each of these processes or blocks may be implemented in a variety of different ways. Also while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the disclosed technology provided herein can be applied to other systems, not necessarily the system described above. The elements and acts of the various examples described above can be combined to provide further implementations of the disclosed technology. Some alternative implementations of the disclosed technology may include not only additional elements to those implementations noted above, but also may include fewer elements.

Any patents and applications and other references noted above, including any that may be listed in accompanying filing papers, are incorporated herein by reference. Aspects of the disclosed technology can be modified, if necessary to employ the systems, functions, and concepts of the various references described above to provide yet further implementations of the disclosed technology.

These and other changes can be made to the disclosed technology in light of the above Detailed Description. While the above description describes certain examples of the disclosed technology, and describes the best mode contemplated, no matter how detailed the above appears in text, the disclosed technology can be practiced in many ways. Details of the system may vary considerably in its specific implementation, while still being encompassed by the disclosed technology disclosed herein. As noted above, particular terminology used when describing certain features or aspects of the disclosed technology with which that terminology is associated. In general, the terms used in the following claims should not be construed to limit the disclosed technology to the specific examples disclosed in the specification, unless the above Detailed Description section explicitly defined such terms. Accordingly, the actual scope of the disclosed technology encompasses not only the disclosed examples, but also all equivalent ways of practicing or implementing the invention under the claims.

We claim:

1. A processor-based method for playing cached information to a another party during a phone conversation with the other party, the method comprising:
    prior to the phone conversation, caching personal information received from a user of a mobile device;
    utilizing a wireless telecommunications network to participate in the phone conversation with the other party, wherein the utilizing includes:
        sending audio to the other party via an outbound audio channel; and
        receiving audio from the other party via an inbound audio channel;
    receiving a command from the user of the mobile device to deliver the cached personal information to the other party during the phone conversation; and
    automatically delivering by a processor, in response to the received command, at least a portion of the cached personal information to the other party via the outbound audio channel.

2. The method of claim 1,
    wherein the cached personal information is recorded audio, and
    wherein the delivering includes transmitting at least a portion of the recorded audio to the other party.

3. The method of claim 1,
    wherein the cached personal information is recorded text, and
    wherein the delivering includes:
        synthesizing speech for at least a portion of the text; and
        transmitting the synthesized speech to the other party.

4. The method of claim 1, wherein the cached personal information includes the user's name and the user's social security number.

5. The method of claim 1, wherein the command from the user is received on a graphical user interface of the mobile device.

6. The method of claim 5,
    wherein the caching information includes caching multiple pieces of personal information,
    wherein the method further includes providing, via the graphical user interface, options for the user to select a cached piece of personal information to deliver, and
    wherein the delivering includes delivering the selected cached piece of personal information to the other party.

7. The method of claim 1, further comprising:
    verifying the authenticity of the user with voice biometrics, wherein the verifying occurs prior to the automatically delivering.

8. The method of claim 1, further comprising:
    muting a speaker and/or a microphone of the mobile device during the automatically delivering.

9. The method of claim 1
    wherein the caching personal information received from a user of a mobile device occurs automatically during a previous phone call to the other party.

10. The method of claim 1, further comprising:
    performing audio to text conversion of commands from an interactive voice response system;
    analyzing the text to determine information requested;
    sending the requested information by the audio channel.

11. A non-transitory computer-readable medium encoded with instructions that, when executed by a processor, perform a method for sending cached information to another party during a phone conversation, the method comprising:
  prior to the phone conversation, caching personal information received from a user of a mobile device;
  utilizing a wireless telecommunications network to participate in the phone conversation with the other party, wherein the utilizing includes:
    sending audio to the other party via an outbound audio channel; and
    receiving audio from the other party via an inbound audio channel;
  receiving a command from the user of the mobile device to deliver the cached personal information to the other party during the phone conversation; and
  automatically delivering by a processor, in response to the received command, at least a portion of the cached personal information to the other party via the outbound audio channel.

12. The non-transitory computer-readable medium of claim 11,
  wherein the cached personal information is recorded audio, and
  wherein the delivering includes transmitting at least a portion of the recorded audio to the other party.

13. The non-transitory computer-readable medium of claim 11,
  wherein the cached personal information is recorded text, and
  wherein the delivering includes:
    synthesizing speech for at least a portion of the text; and
    transmitting the synthesized speech to the other party.

14. The non-transitory computer-readable medium of claim 11, wherein the cached personal information includes the user's name and the user's social security number.

15. The non-transitory computer-readable medium of claim 11, wherein the command from the user is received on a graphical user interface of the mobile device.

16. The non-transitory computer-readable medium of claim 11,
  wherein the caching information includes caching multiple pieces of personal information,
  wherein the method further includes providing, via the graphical user interface, options for the user to select a cached piece of personal information to deliver, and
  wherein the delivering includes delivering the selected cached piece of personal information to the other party.

17. The non-transitory computer-readable medium of claim 11, the method further comprising:
  verifying the authenticity of the user with voice biometrics, wherein the verifying occurs prior to the automatically delivering.

18. The non-transitory computer-readable medium of claim 11, the method further comprising:
  muting a speaker and/or a microphone of the mobile device during the automatically delivering.

19. The non-transitory computer-readable medium of claim 11,
  wherein the caching personal information received from a user of a mobile device occurs automatically during a previous phone call to the party.

20. The non-transitory computer-readable medium of claim 11, the method further comprising:
  performing audio to text conversion of commands from an interactive voice response system;
  analyzing the text to determine information requested;
  sending the requested information by the audio channel.

* * * * *